(12) United States Patent
Haimo et al.

(10) Patent No.: US 8,538,374 B1
(45) Date of Patent: Sep. 17, 2013

(54) EMERGENCY COMMUNICATIONS MOBILE APPLICATION

(76) Inventors: Barry E. Haimo, Fort Lauderdale, FL (US); David A. Kahn, Atlanta, GA (US)

( * ) Notice: Subject to any disclaimer, the term of this patent is extended or adjusted under 35 U.S.C. 154(b) by 0 days.

(21) Appl. No.: 13/313,799

(22) Filed: Dec. 7, 2011

(51) Int. Cl.
*H04W 4/12* (2009.01)

(52) U.S. Cl.
USPC ............ 455/404.2; 455/404.1; 455/410; 370/259; 375/240.01; 375/E7.026

(58) Field of Classification Search
USPC ............ 455/404.1, 466, 404.2, 410, 414.2; 701/301, 45, 117; 340/539.11; 600/300; 379/45; 370/259; 375/240.01, E7.026
See application file for complete search history.

(56) References Cited

U.S. PATENT DOCUMENTS

| | | | |
|---|---|---|---|
| 6,145,083 A * | 11/2000 | Shaffer et al. | 726/7 |
| 2005/0119016 A1 * | 6/2005 | Neumann | 455/466 |
| 2006/0252998 A1 * | 11/2006 | Kimbrell | 600/300 |
| 2008/0074498 A1 * | 3/2008 | An | 348/207.1 |
| 2009/0136006 A1 * | 5/2009 | Milton et al. | 379/45 |
| 2010/0273445 A1 * | 10/2010 | Dunn et al. | 455/404.1 |
| 2010/0297980 A1 * | 11/2010 | Alberth et al. | 455/404.2 |

* cited by examiner

*Primary Examiner* — Mahendra Patel
(74) *Attorney, Agent, or Firm* — Patents on Demand, P.A.; Brian K. Buchheit; Scott M. Garrett

(57) ABSTRACT

An automated system, method or computer program product for providing emergency communications can include an emergency communications application and a MyFlare emergency communications server. The MyFlare emergency communications application can run on a mobile device and can be configured to, when activated, interface with the MyFlare emergency communications server to send preconfigured emergency messages to a preconfigured set of emergency contacts. Different emergency profiles can be preconfigured for which different emergency messages can be sent. Additionally, a different set of emergency contacts can be assigned for different emergency profiles. The emergency communications application can be configured to capture additional information, such as but not limited to GPS location of the device, photo, video, or sound recording, in preconfigured time intervals. The updated information can be sent to the one or more preconfigured emergency contacts as part of the initial emergency message or a subsequent emergency notification update.

17 Claims, 5 Drawing Sheets

EMERGENCY COMMUNICATIONS MOBILE APPLICATION

BACKGROUND

The present invention relates to the field of emergency applications, and in particular, emergency applications for mobile computing devices such as smartphones and tablets.

When faced with an emergency, it is commonplace to contact emergency services via, for example, dialing 911 from a telephone. However, for 911 or other emergency dispatchers to be most helpful and efficient in assessing an emergent situation and the appropriate response to such an emergency, one must be able to continually communicate accurately with the dispatcher. Additionally, to be able to determine where to send help, a dispatcher must possess knowledge of an accurate geographical location of the person in need at the moment of need. Sometimes, during an emergency, individuals do not have the time or ability to stay connected and clearly convey their circumstances to an emergency responder. Furthermore, in an emergency, individuals often do not have enough time for more than a single call; there is usually not an opportunity to contact family or friends in addition to an emergency responder.

In the past, when individuals utilized mostly home phones, the location of the caller was, for the most part, known (i.e., the phone number from which 911 is contacted can be associated with a fixed physical address). Nowadays, individuals often do not have a home phone, and even if they do and that phone is within reach, they often resort to using their mobile phones to make calls such as a 911 call. When outside the home, of course, users are automatically restricted to utilizing their mobile devices. These mobile devices are difficult to assign an emergency response location to ahead of time (as is generally easily done for stationary home phones), due to the fact that a mobile phone holder may be moving across a wide geographic area at any given time. Compounding this can be a scenario in which the person in need of assistance may move or be moved from the location initially reported to emergency personnel.

An additional factor to consider can be that an emergency can be subjective and not all emergencies may require the same response. More specifically, for some situations, which an individual would consider an emergency, the person may wish to contact someone other than the authorities (i.e., police, paramedics, firefighters, etc.) to properly address his or her needs. In some circumstances a user's parents, spouse, other family members or friends may be a more suitable emergency contact. In addition, these non-authority contacts may, in some instances, be able to respond more quickly to an emergency and be able to arrive at the location of the emergency more quickly than the authorities may be able to.

BRIEF SUMMARY

One aspect of the disclosure can include a system for providing automated emergency communications. Such a system can include an emergency communications application (e.g., MyFlare application) and a corresponding communications server (MyFlare server). The emergency communications application can run on a mobile device and can be configured to, when activated, interface with the MyFlare emergency communications server to send preconfigured emergency messages to a preconfigured set of emergency contacts. The emergency communications application can be configured to capture additional information, such as but not limited to GPS location of the device, photo, video, or sound recording, in preconfigured time intervals. The additional update information can be configured to be sent to the one or more preconfigured emergency contacts as part of the initial emergency message or a subsequent emergency notification update.

Another aspect of the disclosure can include a method for providing automated emergency communications. Such a method can begin with the detection of an activation of the MyFlare emergency communications application. In response, the application can then interface with a MyFlare server to automatically send one or more preconfigured emergency messages to one or more preconfigured emergency contacts. Additionally, the method can then also automatically send emergency notification updates (such as video, audio, still images, GPS location of the device, and the like) at predetermined time intervals.

Yet another aspect of the disclosure can include a computer program product that includes a computer readable storage medium having embedded computer usable program code. The computer usable program code can be configured to detect a predetermined activation sequence or mechanism for an emergency communications application. The computer usable program code can be configured to automatically convey one or more emergency messages to one or more predetermined emergency contacts. Lastly, the computer usable program code can be configured to automatically convey emergency notification updates to the one or more predetermined emergency contacts with additional information (for example, GPS location of the device, audio, video or still image capture, and the like).

DETAILED DESCRIPTION

Figure 1:
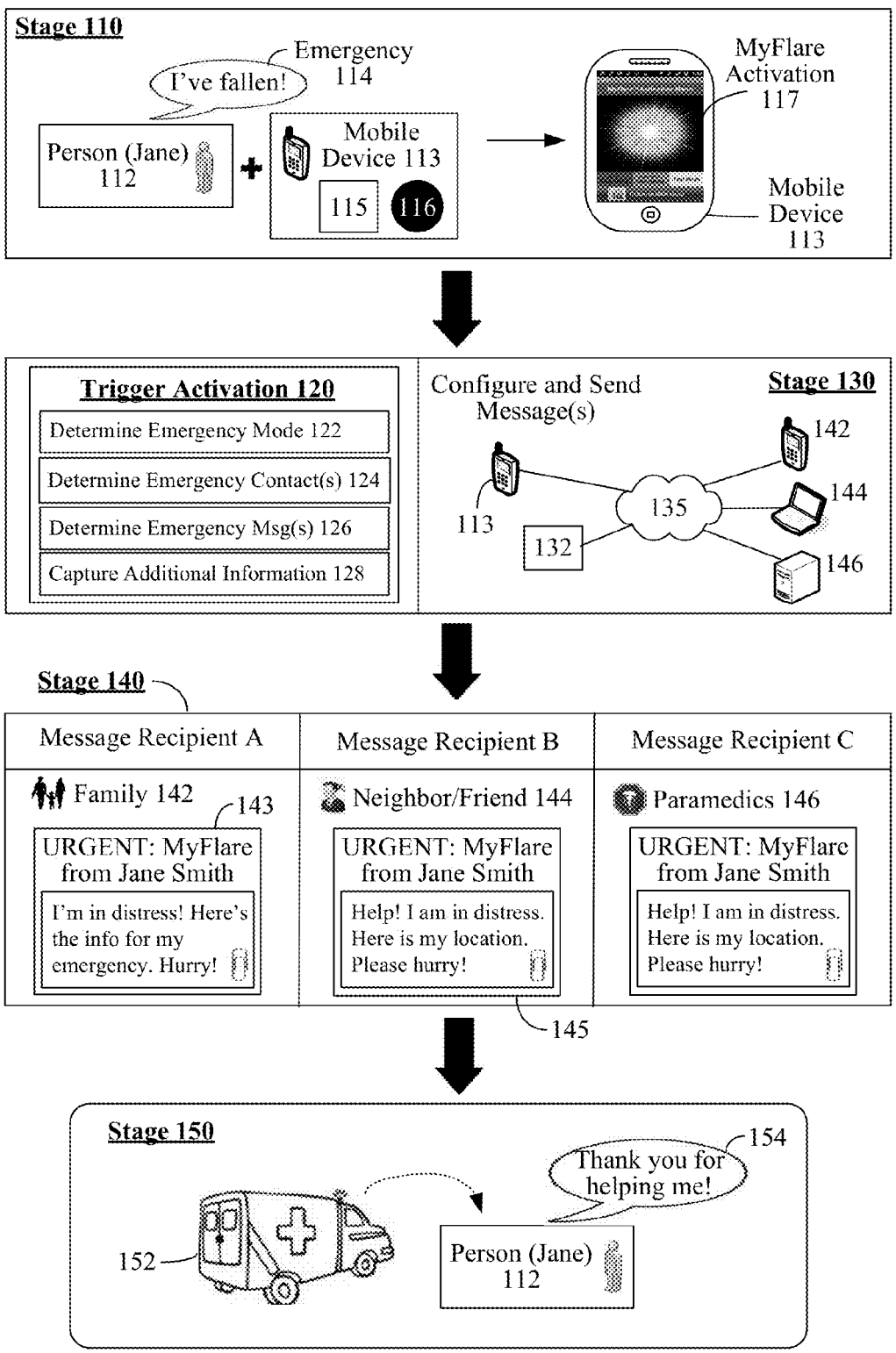
FIG. 1 is an illustration of an implementation of an emergency communication mobile application in accordance with embodiments of the inventive arrangements disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is an illustration of an implementation 100 of an emergency communication mobile application with stages 110, 120, 130, 140 and 150 in accordance with embodiments of the inventive arrangements disclosed herein. Stages 110 through 150 are for illustrative purposes only, and are not meant to be interpreted as an absolute implementation or limitation of an embodiment of the present disclosure.

In stage 110, a person (Jane) 112 is in an emergent situation 114. For example, Jane has fallen and cannot get help herself. Jane, however, has access to a mobile device 113 with the MyFlare emergency communications application 115, which she can instantly activate with an activation pin, pattern or button 116. After MyFlare activation 117 Jane need not do anything more than wait for help to arrive.

Activation patterns can be user-specific and cover a variety of hardware/software input mechanisms. For example, Jane can have set up MyFlare to allow her to press the volume button for 5 seconds continually to auto-activate a 911 emergency mode. In one embodiment, a set of conditions (e.g., entry/exit of the position of the device 113 from a predefined geographic region as compared against a set of GPS coordinates; existence of a characteristic sound like breaking glass or the phone user screaming "help" in a certain decibel range as determined from a microphone of the mobile device 113; lack of movement towards an expected destination as determined from a calendar entry, clock, and GPS position; characteristic shaking pattern of the phone as detected by accelerometers; and the like) can be defined by a user and compared against parameters/conditions of the mobile device 113, where established logic determines whether a MyFlare activation 117 occurs.

In stage 120, or trigger activation 120 stage, the application can determine the specific emergency mode 122 activated. It can then, in one embodiment, communicate with the MyFlare server 132 to determine one or more emergency contacts 124 which will receive an emergency message and which communications method the message will be conveyed by (for example, text, IM, voice, email, etc.). In one instance, the MyFlare application can utilize the mobile device GPS feature to locate and trace mobile phone contacts' locations (when these contacts have previously allowed tracing), and can utilize the geographically most proximate contacts I addition to or in lieu of preconfigured MyFlare emergency contacts, thus potentially increasing the probability of first response. Additionally, emergency messages can be sent to other MyFlare application users' devices within a predetermined geographic radius to alert the users of an emergency occurring in their proximity so they can either avoid the area or respond to the emergency situation.

For example, the phone can determine or inform the user that "Barry is within 10 miles of you", or "Jared is within 1.4 miles of you" and then select Jared as a contact to receive a MyFlare emergency notification. This can, in one embodiment, include determining GPS location internationally and allow for a user to have multiple international MyFlare profiles. In this instance, a MyFlare International Version, the preferences can enable a user to designate his or her emergency number(s) depending on what city and country he or she are located in. In a unified domestic and international MyFlare version a server can determine a user's geographical position and respective applicable emergency response profile prior to or post MyFlare emergency application activation.

Additionally, when interfacing with the MyFlare server 132, the application can determine the specific emergency message(s) 126 to send to the determined one or more emergency contacts (or other defined recipient). Optionally, the application can also trigger other mobile phone applications to capture additional information 128. For example, in one embodiment, the application can activate the device's GPS to record the mobile device's location; this GPS tracking can occur even prior to user activation of an emergency mode to continually track a user from the MyFlare server and have pre-emergency information available in an emergent situation. In another embodiment, the application can signal the phone's camera to snap a still image or video clip to be included with the emergency message. These activated and captured images, sounds, positions, etc. can be periodically conveyed to the set of people who received the emergency message(s). Different messages and/or captured input can be sent to different ones of the emergency contacts.

In stage 130, the application on mobile device 113 can communicate with the MyFlare server 132 to configure and send the one or more emergency messages via network 135 to emergency contact devices 142, 144, 146. The emergency messages can be sent in a variety of manners, for example, a text message, instant message (i.e., AIM, BBM, iMessage, etc.), email, prerecorded voice recording, video, image(s), fax, and the like. Different emergency messages can be sent to different emergency contacts (over one or more communication channel) as is shown in stage 140.

During stage 140 emergency contacts (message recipients A, B, and C) receive MyFlare notifications. For example, one notification can be sent to Jane's family's cellphone and include message 143 with attachments. Another emergency notification can be sent to Jane's neighbor and friend 144 and include message 145. In this instance, message 145 can be different from message 143 as preconfigured by Jane. Yet another emergency message can be sent directly to authority emergency contacts such as paramedics 146. Paramedics 146 can receive the same message as Jane's neighbor/friend.

Stage 150 shows that responsive to having received an emergency notification from Jane her emergency contacts can respond by arriving at her location to provide help. In this instance, the paramedics 152 can arrive at person (Jane) 112's location first. Instead of remaining in danger Jane is helped and her emergency can be resolved 154.

Figure 2:
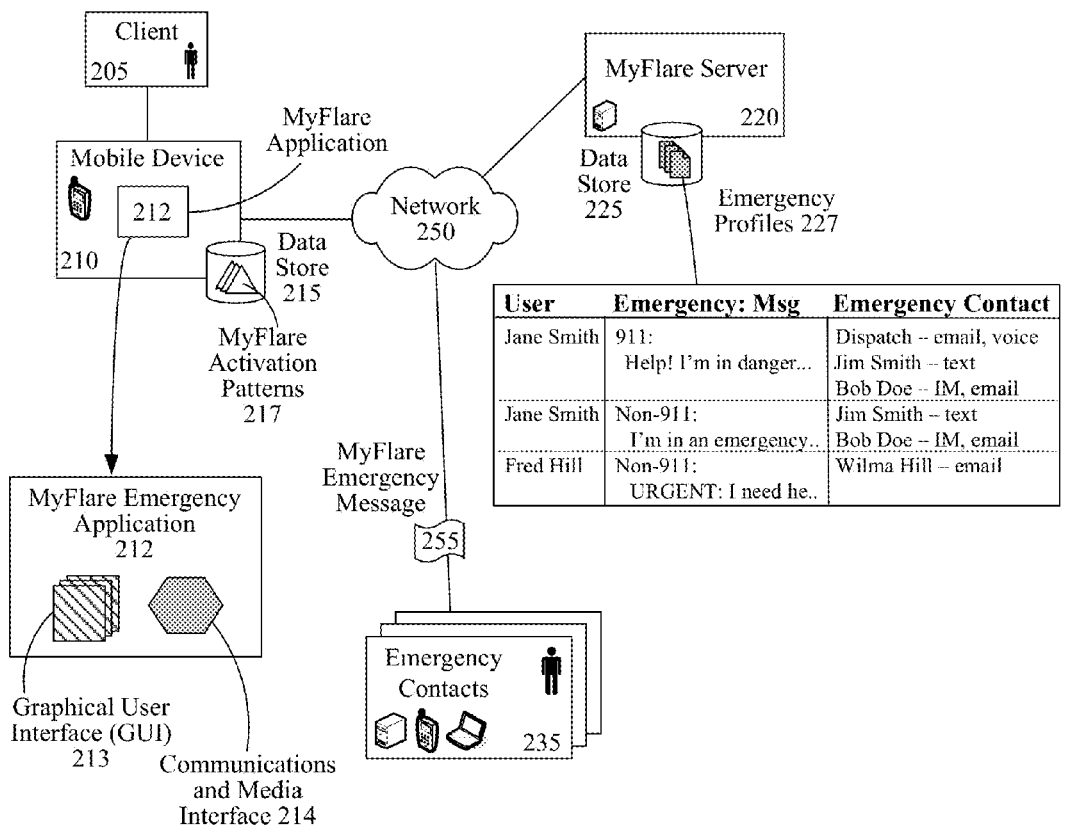
FIG. 2 is a schematic diagram illustrating a system that automatically communicates MyFlare emergency messages to one or more emergency contacts in accordance with embodiments of the inventive arrangements disclosed herein.

FIG. 2 is a schematic diagram illustrating a system 200 that automatically communicates MyFlare emergency messages to one or more emergency contacts in accordance with embodiments of the inventive arrangements disclosed herein. The system 200 can include a client 205, a mobile device 210, a MyFlare server 220, emergency contacts 235 and network 250. System 200 and its components can be configured to configure, send and properly route MyFlare emergency messages 255. It should be noted that the components illustrated within the system 200 are for illustrative purposes only, and are not meant to be interpreted as an absolute implementation or limitation of an embodiment of the present disclosure.

Client 205 can utilize mobile device 210 to utilize the MyFlare application 212 in order to automatically send one or more emergency notifications to one or more emergency contacts. Mobile device 210 can include MyFlare application 212, and data store 215 containing MyFlare activation patterns 217. MyFlare activation patterns can be configured by the user 205 to auto-activate various emergency profiles within MyFlare application 212. MyFlare activation patterns can be, for example, a hardware button to be pressed, a pin or password to be entered or a specific unlock pattern for the phone home screen, device shake activation, and the like. Additional activation patterns 217 are contemplated.

MyFlare emergency communications application 212 can be utilized within the context of system 200 or any other system supporting the automatic provision of emergency communications from mobile devices to a set of emergency contact recipients. In one embodiment, the MyFlare emergency communications application can be, when broadcasting an emergency mode, be able to be integrated into a security surveillance system. Any security surveillance system integration is contemplated, such as integration with a home alarm or surveillance system, a business entity's surveillance system, a public service entity's surveillance system, and the like. For example, should a student be in danger on a university campus, upon MyFlare application emergency mode activation, an emergency message can be directed to campus security in addition to or in lieu of general 911 dispatch due to campus security's proximity advantage in responding to the situation.

In one embodiment, such an emergency message to campus security can trigger campus security cameras to direct themselves to the emergency location to record video of the emergency. Additionally, in this instance, nearby floodlights can be activated to illuminate the area and/or nearby emergency call boxes can broadcast a siren, and the like. It should be noted that integration with additional systems is not only limited to surveillance systems. Other collaborative endeavors such as integration with emergency response providers or third party emergency response service providers, and the like, are contemplated. In another embodiment, collaborative integrations can be expanded to also include allowing MyFlare application access or facilitate access for first responders to a server for an individual's medical records or preconfigured select crucial medical information (as far as HIPPA laws allow and individuals provide permissions).

The MyFlare emergency application 212 can include one or more graphical user interfaces (GUIs) 213, and a communications and media interface 214. A GUI 213 can represent the interaction mechanism by which a user can perform functions with and/or enter data into MyFlare application 212. Multiple GUIs 213 can exist, each presenting different data and/or functionality. The quantity of GUIs 213 and/or their configuration can depend upon the design and implementation of the emergency communications application 212.

The communications and media interface 214 can represent the component of the MyFlare application 212 that can establish use of the various communication media and/or software applications of the mobile device. For example, when an emergency mode has been activated and the MyFlare application is configured to include a still image and GPS location, the communications and media interface 214 can activate the phone component of the mobile device and capture the appropriate GPS location and still image to be attached to the emergency message. In another embodiment, communications and media interface 214 can allow MyFlare application to synch with social networking services (e.g., FACEBOOK, TWITTER, etc.) to visually display a MyFlare emergency contacts "network" and promote awareness of MyFlare application. Moreover, emergency messages can be posted on social networking services in addition to sending emergency messages as described previously if a user desires.

MyFlare server 220 can include data store 225, which can contain emergency profiles 227. In one embodiment, data store 227 can also contain user preferences for attachments and the like as discussed further in FIG. 4. Emergency profiles 227 can include information on user preconfigured emergency modes, emergency messages for the preconfigured emergency modes and emergency contacts for the preconfigured emergency modes. Emergency contacts can be authority (i.e., police, paramedics, firefighters, etc.) and non-authority contacts. The non-authority contacts can be notified in lieu of or in addition to the authorities.

In one embodiment, a different set of emergency contacts can be assigned to different emergency modes and different messages can be assigned to different emergency contacts. Additionally, emergency contacts can have one or more contact addresses or numbers associated with them (for example, in one embodiment, a single emergency contact can have both an email address as well as an IM address registered as contact methods for MyFlare emergency notifications).

When activated, the MyFlare application 212 can, in one embodiment, communicate with MyFlare server 220 to determine the specific emergency messages to send to the specific emergency contacts. Additionally, the MyFlare application 212 in conjunction with the MyFlare server 220 can establish what, if any, type of attachments to include in the emergency message 255 to be sent to emergency contacts 235. As previously mentioned, attachments can include GPS location of the device 210, and by extension the client 205, a still image, video, or audio recording, and the like. It should be understood that communication with the MyFlare server 220 is not necessary to implement an instance of the disclosure and information such as emergency contacts, emergency messages to send, attachment preferences, and the like, can in another embodiment be stored on the mobile phone's storage device itself.

Network 135, 250 can include any hardware/software/and firmware necessary to convey data encoded within carrier waves. Data can be contained within analog or digital signals and conveyed though data or voice channels. Network 135, 250 can include local components and data pathways necessary for communications to be exchanged among computing device components and between integrated device components and peripheral devices. Network 135, 250 can also include network equipment, such as routers, data lines, hubs, and intermediary servers which together form a data network, such as the Internet. Network 135, 250 can also include circuit-based communication components and mobile communication components, such as telephony switches, modems, cellular communication towers, and the like. Network 135, 250 can include line based and/or wireless communication pathways.

As used herein, presented data stores 215 and 225 can be a physical or virtual storage space configured to store digital information. Data stores 215 and 225 can be physically implemented within any type of hardware including, but not limited to, a magnetic disk, an optical disk, a semiconductor memory, a digitally encoded plastic memory, a holographic memory, or any other recording medium. Data stores 215 and 225 can be a stand-alone storage unit as well as a storage unit formed from a plurality of physical devices. Additionally, information can be stored within data stores 215 and 225 in a variety of manners. For example, information can be stored within a database structure or can be stored within one or more files of a file storage system, where each file may or may not be indexed for information searching purposes. Further, data stores 215 and/or 225 can utilize one or more encryption mechanisms to protect stored information from unauthorized access.

Figure 3:
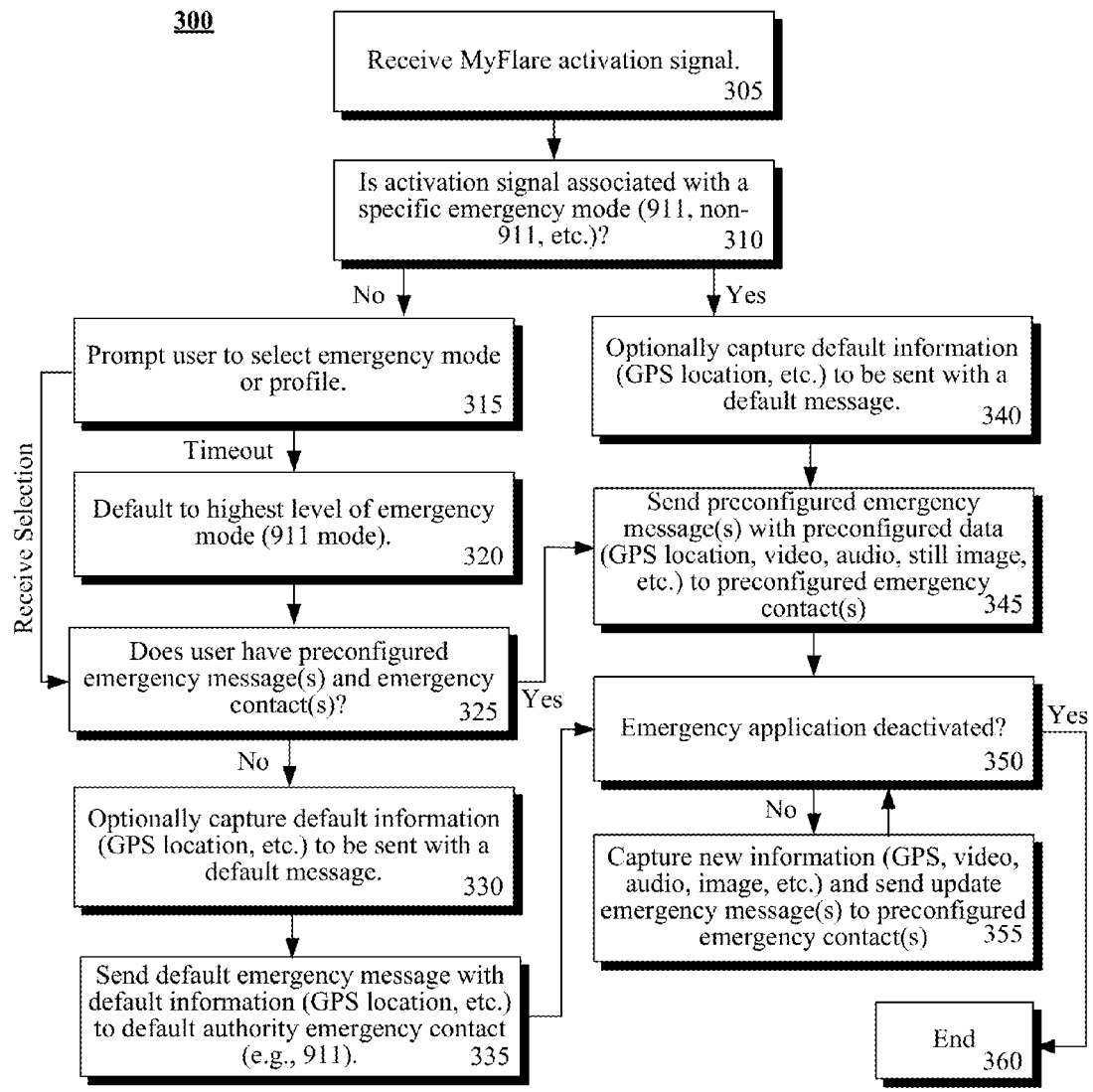
FIG. 3 is a flowchart of a method for automatically providing MyFlare emergency communications in accordance with an embodiment of the inventive arrangements disclosed herein.

FIG. 3 is a flowchart of a method 300 for automatically providing MyFlare emergency communications in accordance with an embodiment of the inventive arrangements disclosed herein. The flowchart shows a set of steps (steps 305-360) that can occur in accordance with the inventive arrangements disclosed herein to automatically send emergency messages to one or more emergency contacts.

In step 305, a MyFlare activation signal is received. As mentioned previously, an activation signal can be the result of a user utilizing a touchscreen GUI menu of the MyFlare activation display of the emergency communications application or a preconfigured hardware button (such as, for example, pressing the volume button a preconfigured number of times) to indicate his or her desire to activate an emergency mode. In one embodiment, a certain activation signal can be associated with different emergency modes. In another embodiment, a single activation signal can be set as the default activation signal for the emergency communications application.

Subsequently the method can proceed to step 310 where it can be determined whether or not the received activation signal is associated with a specific emergency mode (for example, a 911 mode or a non-911 emergency mode, and the like). When a signal specific to an emergency mode is received the method can proceed to step 340. In contrast, when a default activation signal is received, i.e., the activation signal is not associated with a specific emergency mode, in step 315, the application running on the user mobile device can prompt the user to select an emergency mode or profile. Upon receiving a selection the method can proceed to step 325. Should a selection not be received before timeout, the method can continue in step 320 to default to the highest level of emergency mode (for example, the 911 mode designated to also alert authorities). It should be noted that the time lapsed for selection of an emergency mode before timeout can, in one embodiment, be adjusted via user preferences.

In step 325, the application can interface with the MyFlare server, if desired or necessary, to determine whether or not the user has one or more preconfigured messages and one or more preconfigured emergency contacts set up for the emergency mode. Should the user not have preconfigured application performance for the selected or default emergency mode, the application can, in step 330, capture default optional information (for example, GPS location of the device only). Subsequently, in step 335, the application can send or can, after providing the MyFlare server with the optional additional information, instruct the MyFlare server to send a default emergency message including default information (such as, for example, the GPS location of the user's mobile device) to one or more default authority contacts (for example, to a 911 dispatcher, and the like). The method can then progress to step 350.

Should, on the other hand, the user do have one or more stored preconfigured emergency messages and one or more preconfigured emergency contacts for the selected emergency mode, the application can, proceed, in step 340, with optionally capturing preconfigured information to be sent along with the preconfigured message (for example, GPS location, video, audio, still image, etc.). Then, in step 345, the application can send or can, after providing the MyFlare server with the optional additional information, instruct the MyFlare server to send the user's preconfigured emergency message(s) along with optional preconfigured data (GPS location, video, audio, still image, etc.) to the one or more preconfigured emergency contacts. It should be noted that if a user has selected to preconfigure a sound to be played (for example, a siren or horn sound) continuously or intermittently, the sound can be started at step 335 or 345 until a user can select to terminate the sound from being emitted. Furthermore, additional functionality aside from having a sound emitted from the mobile device is contemplated. For example, initiation of a surveillance system alarm siren or floodlights, recording equipment, etc. can be achieved in steps 335 or 345.

In step 350, it can be detected whether or not the MyFlare emergency communications application has been deactivated. If the application has been deactivated the method can end in step 360. It should be noted that in one embodiment, a user can be prompted to enter a confirmation code for terminating the application to ensure he or she truly wishes to exit the application and cease broadcasting emergency messages. In this embodiment, it can also be possible for the application to have, along with a true termination confirmation code, a "fake" confirmation code stored. This can be utilized in case an individual is under duress to deactivate the application. The "fake" confirmation code can, in this embodiment, signal to the application to run in the background and continue transmitting emergency messages with updates to emergency contacts.

If the application has not been terminated, the method can proceed to step 355. In step 355, the application can continue to capture new information (for example, GPS location, video, audio, still image, etc.) and send one or more update emergency messages to the one or more emergency contacts. The application can remain in a loop between steps 350 and 355 until the application is exited and the method ends in step 360.

Figure 4:
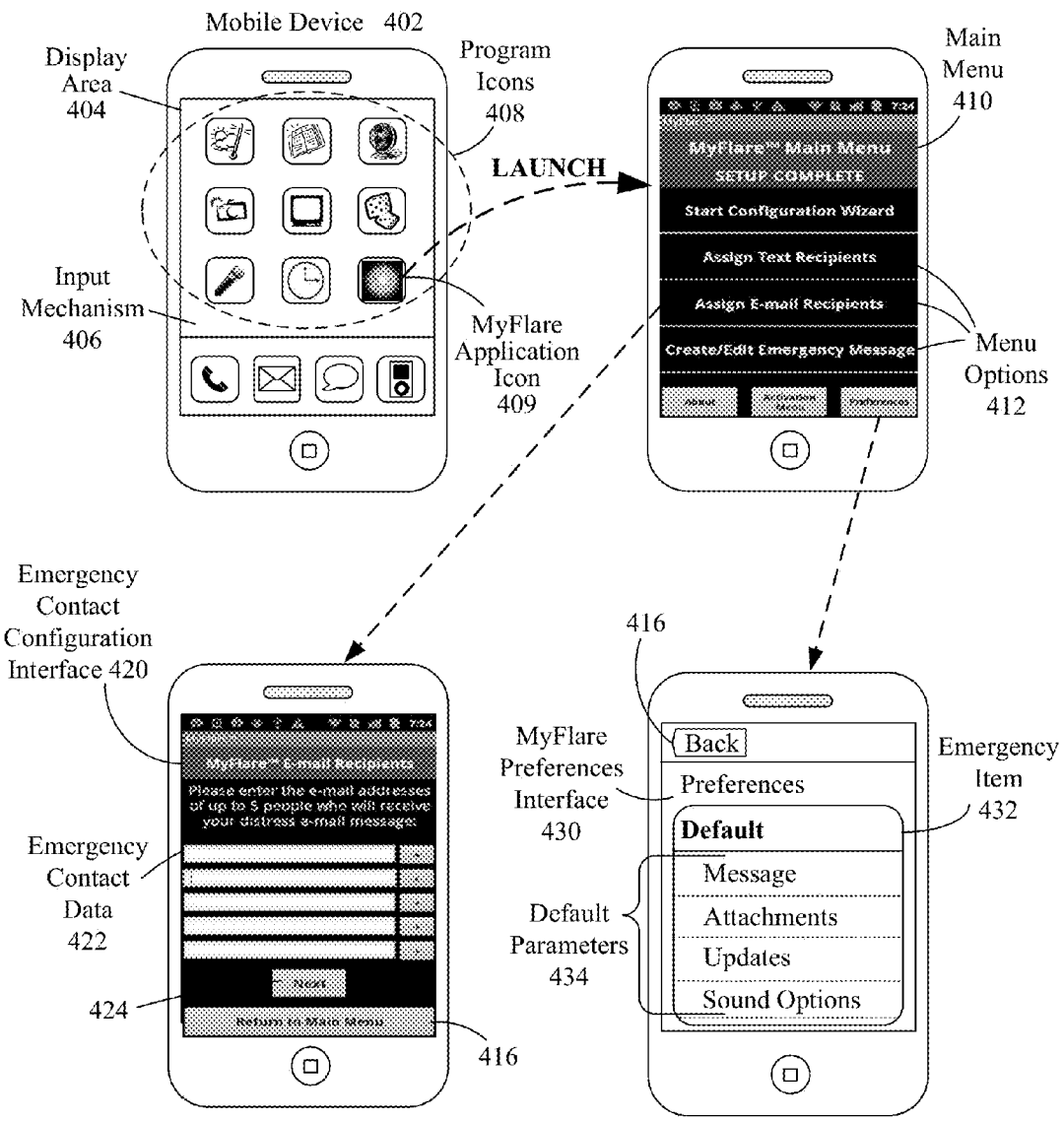
FIG. 4 is a collection of mobile device graphical user interfaces (GUIs) illustrating a sample implementation of the legal matter management application in accordance with an embodiment of the inventive arrangements disclosed herein.
Figure 4A:
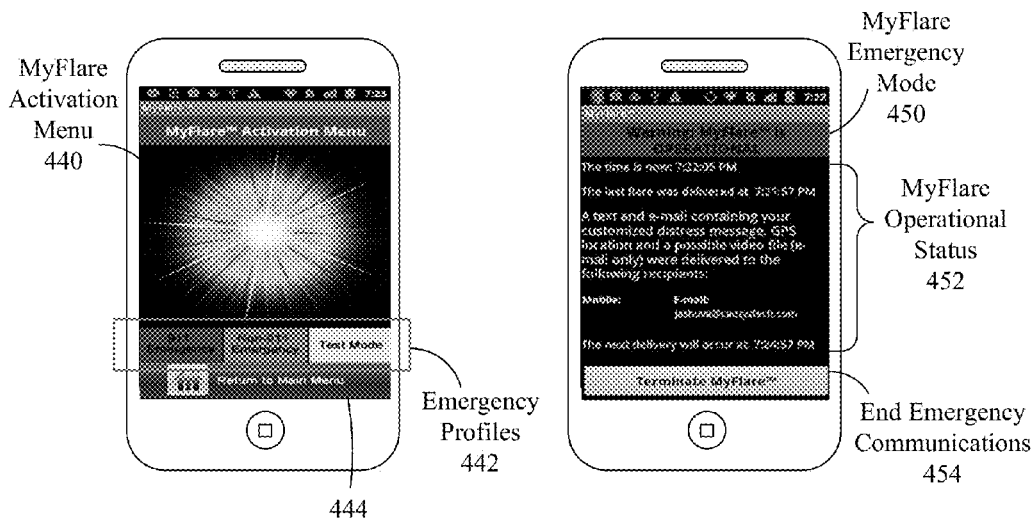
FIG. 4A is a collection of MyFlare GUIs from an emergency message sender's perspective in accordance with an embodiment of the inventive arrangements disclosed herein.
Figure 4B:
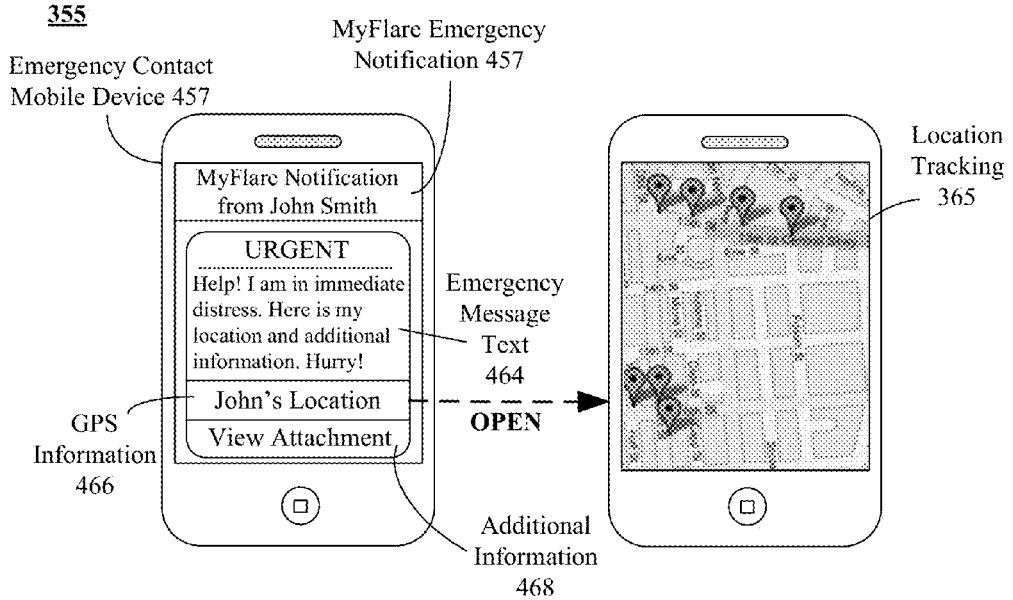
FIG. 4B is a collection of MyFlare GUIs from an emergency message recipient's viewpoint in accordance with an embodiment of the inventive arrangements disclosed herein.

FIG. 4 is a collection 400 of mobile device graphical user interfaces (GUIs) illustrating a sample implementation of the legal matter management application in accordance with an embodiment of the inventive arrangements disclosed herein. It should be appreciated that the GUIs presented in FIGS. 4, 4A, and 4B are for illustrative purposes only, and that additional configurations and functionalities can be incorporated without diverging from this embodiment of the present invention.

In collection 400, a mobile device 402, for example an iPHONE, BLACKBERRY or ANDROID smartphone, can provide access to the MyFlare emergency communications application via a MyFlare application icon 409. The mobile device 402 can include a display area 404 and an input mechanism 406, which, in this example, are one-and-the-same. That is, the display area 404 of a mobile device 402 can also be used as the input mechanism 406, for example, with a touch screen.

The MyFlare emergency communications application icon 409 can be presented in addition to other program icons 408, representing other software applications and/or services installed upon the mobile device 402. Selection of the MyFlare application icon 409 using the input mechanism 406 to launch the emergency communications application can result in the display of the main menu 410.

The main menu 410 can present the user with high-level menu options 412. As shown in this example, the menu options 412 of the main menu 410 can include a configuration wizard option, an option to assign text recipients of an emergency message, an option to assign email recipients for an emergency message. An option to create or edit emergency messages, an about button, a button to open the activation menu and a preferences button.

Interfaces 420 and 430 of FIG. 4 described below, can illustrate GUIs specific to the email recipients configuration and preference options 412 of the main menu 410. Selection of the "Assign E-mail Recipients" option 412 can present the user with GUI 420, while selection of the "Preferences" tab or button can present the user with GUI 430.

Emergency contact configuration interface 420 can allow the user to enter email addresses for emergency message or notification recipients in emergency contact data 422 fields. A similar menu can be presented to a user for the "Assign Text Recipients" option 412 of main menu 410. In another embodiment, additional contact configuration interfaces 420 can include an interface for IM contacts, voice contacts, video chat, and the like. A selector 424 to continue onto the next configuration screen as well as an option to return 416 to the main menu can also be included in GUI 420.

GUI 430, a MyFlare preferences interface 430, can be presented to the user after the selection of the preferences tab or button from the menu options 412 of the main menu 410. The preferences interface can include options for configuring user preferences for emergency items 432. In this particular example, the default (to be applied to all emergency modes unless otherwise modified) is shown as the emergency item 432 addressed. Default parameters 434 can include, but are not limited to message options, attachment options, update options, sound options, and the like.

Message parameters can be, for example, default message delivery (for example, always default to email or always default to text, etc.) Attachment options can address, for example, what type of attachment(s) to include with an emergency message. However, since the MyFlare emergency message communications application is designed to operate on a mobile device 402, resource constraints such as memory space should be considered. Additionally, in one embodiment, the attachment options can be sensitive to mobile device battery status and the application can expand or limit the number or type of attachments sent along with an emergency message as necessary. In another embodiment, additional information to be utilized for attachments such as GPS location, still image, video, or audio can be randomly sampled before activation of an emergency mode to be sent with the first emergency message.

Update parameters can control the number of emergency message updates to send, the intervals between emergency messages or attachment updates, and the like. Sound options, for example, can determine if and what type of sound to broadcast when an emergency mode is activated and for how long. Additional parameters, such as but not limited to hardware button assignment or specific input pattern assignment for activation of MyFlare emergency communications application, for user preferences are contemplated.

FIGS. 4A and 4B, each discussed below, can illustrate GUIs specific to the MyFlare application on the user side once operational and on the receiving side of the emergency message once in process of receiving MyFlare emergency messages or notifications. FIG. 4A illustrates a GUI specific to the activation menu option 312 of the main menu 410, while FIG. 4B illustrates a GUI specific to a message recipients' notification display 462.

FIG. 4A is a collection 435 of MyFlare GUIs from an emergency message sender's perspective in accordance with an embodiment of the inventive arrangements disclosed herein. Selection of the activation menu option 412 can present the user with GUIs 440 and upon selection of an emergency profile, subsequently, GUI 450. When launching the MyFlare activation menu 440, the user can be presented with a GUI for selecting to activate various emergency profiles 442. MyFlare activation menu 440 can also include an option to return 416 or 444 to the main menu.

In one embodiment, a separate "time-out activation" mode of the MyFlare application can initiate MyFlare operation with an initial timeout feature that can lead to auto-activation of the MyFlare emergency application only after a certain period of time has elapsed and the feature has not been deactivated in that time. For example, Jane 112 can be walking across campus to her dorm at night. She can set the countdown timer to 10 minutes because the walk usually takes 6 minutes. If Jane 112 does not deactivate the timer or if the phone is turned off, the MyFlare application can be activated via the MyFlare server 220. As mentioned previously, in addition to usual activation (i.e., emergency message sending), the mode can trigger the server to activate the emergency blue lights on campus and/or any other security device in the geographic vicinity to Jane 112's last known coordinates as reported from her device to the server (depending on permissions and preferences configured by the user).

It should be noted that a user may not necessarily need to be presented with the MyFlare activation menu 440 GUI to activate emergency communications. In one embodiment, specific hardware buttons can be assigned to launch and activate MyFlare application upon being pressed. In another embodiment, an alternate "unlock" pattern or pincode/password for a user's mobile device can be programmed to activate and launch a specific or default emergency mode of the MyFlare application. In yet another embodiment, geo-fencing can be utilized to launch and automatically activate a specific emergency mode based on device (and by extension) user location in relation to a predetermined geographic area of "danger."

Once activated and an emergency profile has been selected or assigned (as discussed in FIG. 3 when a default emergency mode is selected upon no user specific selection), MyFlare emergency mode 450 GUI can be displayed on the user device. The MyFlare emergency mode 450 GUI can include information about the specific emergency mode running, as well as specifics of the MyFlare operational status 452. Specifics of the operation status 352 can include, as shown, the exact time of the last emergency notification sent, the next scheduled message to be sent, and the like. An option or button to end emergency communications (i.e., terminate MyFlare application communications) 454 can be included in GUI 450. It should be noted that in one embodiment the MyFlare emergency communications application can run in the background and, as such, a user may not be presented the MyFlare emergency mode 450 GUI unless specifically called upon or opened by the user.

FIG. 4B is a collection 455 of MyFlare GUIs from an emergency message recipient's viewpoint in accordance with an embodiment of the inventive arrangements disclosed herein. Emergency notification GUI 460 and location tracking GUI 470 are displayed on the emergency contact mobile device 457. Emergency notification GUI 460 can include the emergency message text 464 and links or embedded images of the various attachments 466, 468 included with the emergency message 464. Attachment 466 can be a link to the emergency message sender's GPS location 466. Additional information attachment 468 can include a still image, a video recording, an audio recording, and the like.

As shown in this example, the emergency message 364 and attachments 366, 368 can be text presented within display of device 457. The emergency message 364 can also include hyperlinks, images, playable audio and/or video, uniform resource locators (URLs), and the like. In one embodiment, an optional feature to auto-record emergency message notifications and content (aiding chain of custody for investigation and evidence in legal proceedings) to be compiled in a single file can be included. It should be noted, however, that MyFlare emergency messages, can in another embodiment, be recorded on the MyFlare server for future potential need in investigation and evidence in legal proceedings to preserve proper chain of custody. Upon user selection of displaying GPS location information 466, a maps application on emergency contact device 457 can launch and visually display GPS location information for the emergency message sender's device as sent with the emergency notification as displayed by GUI 460.

Each location icon 372 can include, for example, a timestamp or can be numbered in an increasing fashion to correctly allow movement tracking of the emergency message sender's device. In one embodiment, the emergency message on the receiver's end, as well as additional attachment information can be shared with others if deemed necessary by the emergency message recipient by another mechanism than it was received. For instance, a received emergency message email can include a link to text the information to someone else. Additionally, an option to share only a part of the received emergency notification or a selected attachment via a communications method of the emergency message receiver's choice can be included in GUI 460. It should be noted that a GUI such as GUI 460 can be accessible on the MyFlare user's device visually plotting the user's location and in one embodiment also plotting locations of interest (i.e., safe havens) in an emergency situation, such as hospitals, police stations, fire stations, and the like, within a preconfigured or default radius of the user's latest recorded location. These safe havens can auto-update with each new MyFlare user location beacon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:
1. A method in a mobile device comprising:
  receiving at a mobile device an activation triggering input for an emergency communications application, wherein the emergency communication application runs on the mobile device and facilitates information exchanges between an emergency communications server and the mobile device;

determining an emergency mode associated with the received activation message, wherein an emergency mode outlines user preferences specific to the emergency mode for the emergency communications application;
determining one or more emergency contacts to whom one or more emergency messages are to be sent, wherein the one or more emergency messages are also determined, wherein the one or more emergency messages differ for different emergency mode profiles of the emergency communication server or for different emergency contacts of the mobile device, wherein the one or more emergency messages are preconfigured by the emergency communications application user;
capturing one or more additional information items to be attached to the one or more emergency messages;
automatically launching emergency communications associated with the determined emergency mode, wherein launching emergency communications comprises sending the one or more emergency messages to the one or more emergency contacts;
determining whether or not the emergency communications application has been terminated;
responsively capturing one or more updated additional information items to be sent with one or more update emergency messages; and
continuing to send the one or more update emergency messages until the emergency communications application has been terminated.

2. The method of claim 1, wherein the one or more emergency contacts comprises authority emergency contacts and non-authority emergency contacts, wherein authority contacts are publically provided emergency services, and wherein non-authority emergency contacts are family members, friends, or acquaintances.

3. The method of claim 1, wherein the one or more emergency contacts are be reached by instant message (IM), email, text, or voice.

4. The method of claim 1, wherein the one or more additional information items include a still image, a video recording or an audio recording.

5. The method of claim 1, further comprising:
redirecting an authority contact emergency message to local authority contacts based on captured GPS location; and
activating local surveillance system, wherein a local surveillance system directs its components to monitor the GPS location of the emergency situation.

6. The method of claim 1 further comprising:
displaying a configuration wizard interface upon initial activation of the emergency communications application, wherein the configuration wizard interface consists of emergency contact configuration GUIs, emergency message configuration GUIs, additional information item configuration GUIs, or preference configuration GUIs.

7. The method of claim 1, further comprising:
detecting a 911 call from the mobile device, which is the activation message for the emergency communications application, which results in the sending of the one or more emergency messages to the one or more emergency contacts, which includes at least one contact not associated with the 911 call.

8. The method of claim 1, further comprising:
detecting a 911 call from the mobile device, which is the activation message for the emergency communications application, which results in the sending of the one or more emergency messages to the one or more emergency contacts, which includes at least one contact associated with the 911 call, and which automatically provides data concerning the 911 call, which need not be input and/or spoken by the caller making the 911 call.

9. The method of claim 1, further comprising:
pressing a button on the mobile device a characteristic number of times or for a characteristic duration, which is the activation message for the emergency communications application, wherein the button of the mobile device is associated with a default function unrelated to the emergency communications application, wherein a standard pressing of the button causes the mobile device to activate the default function that is unrelated to the emergency communications application.

10. The method of claim 1, wherein activation of the emergency mode automatically results in the mobile device running the emergency communications application dialing 911 emergency services, which occurs in addition to the sending of the one or more emergency messages to the one or more emergency contacts.

11. A method 1, further comprising:
a sensor of the mobile device upon which the emergency communications application runs receiving environmental input, said environmental input comprising ambient noise, an image or video received from a camera, or a set of GPS coordinates;
automatically determining from the environmental input, an existence of a probability of an emergency that is greater than a previously defined threshold for an emergency; and
responsive to the determining, automatically providing the activation message for the emergency communications application.

12. The method of claim 1, wherein the environmental input is conveyed within at least one of the emergency messages.

13. The method of claim 1, wherein the environmental input triggering the activation message comprises an audio input for at least one of breaking glass, a scream, a sound of a vehicle having an accident, an emergency vehicle siren, and a user configured sound defined for triggering the activation message.

14. A computer program product, the computer program product comprising a non-transitory computer readable storage medium having computer usable program code embodied therewith, the computer usable program code comprising:
computer usable program code configured to receive at a mobile device an activation triggering input for an emergency communications application, wherein the emergency communication application runs on the mobile device and facilitates information exchanges between an emergency communications server and the mobile device;
computer usable program code configured to determine an emergency mode associated with the received activation message, wherein an emergency mode outlines user preferences specific to the emergency mode for the emergency communications application;
computer usable program code configured to determine one or more emergency contacts to whom one or more emergency messages are to be sent, wherein the one or more emergency messages differ for different emergency mode profiles of the emergency communication server or for different emergency contacts of the mobile device running the emergency communications application, wherein the one or more emergency messages are preconfigured by the emergency communications application user;

computer usable program code configured to capture one or more additional information items to be attached to the one or more emergency messages;

computer usable program code configured to automatically launch emergency communications associated with the determined emergency mode, wherein launching emergency communications comprises sending the one or more emergency messages to the one or more emergency contacts;

computer usable program code configured to determine whether or not the emergency communications application has been terminated;

computer usable program code configured to responsively capture one or more updated additional information items to be sent with one or more update emergency messages; and computer usable program code configured to continue sending the one or more update emergency messages until the emergency communications application has been terminated.

15. A mobile device comprising:

one or more processors;

one or more transceivers for transmitting and receiving wireless data;

one or more sensors for detecting events;

one or more storage devices storing program instructions, wherein executing the program instructions by the one or more processes causes the computing device to:

receive at the mobile device an activation triggering input for an emergency communications application, wherein the emergency communication application runs on the mobile device and facilitates information exchanges between an emergency communications server and the mobile device;

determine an emergency mode associated with the received activation message, wherein an emergency mode outlines user preferences specific to the emergency mode for the emergency communications application;

determine one or more emergency contacts to whom one or more emergency messages are to be sent, wherein the one or more emergency messages differ for different emergency mode profiles of the emergency communication server or for different emergency contacts of the mobile device running the emergency communications application, wherein the one or more emergency messages are preconfigured by the emergency communications application user;

capture one or more additional information items to be attached to the one or more emergency messages;

automatically launch emergency communications associated with the determined emergency mode, wherein launching emergency communications comprises sending the one or more emergency messages to the one or more emergency contacts;

determine whether or not the emergency communications application has been terminated;

responsively capture one or more updated additional information items to be sent with one or more update emergency messages; and continue sending the one or more update emergency messages until the emergency communications application has been terminated.

16. The system of claim 15, wherein the emergency communication server maintains emergency profiles, wherein emergency profiles include one or more user information, one or more user specific emergency mode information, one or more emergency mode specific emergency contacts and one or more emergency contact specific emergency messages, wherein the emergency communications application running on the mobile device can trigger capturing of one or more additional information items, wherein the one or more additional information items is a GPS location, a video recording, an audio recording, or a still image, and wherein the one or more additional information items are attached to the one or more emergency messages sent to the one or more emergency contacts.

17. The system of claim 15, wherein the one or more emergency messages are previously configured ones which are dependent upon a deterministic condition, wherein the emergency communication server ascertains the deterministic condition given input from a device upon which the emergency communication executes, wherein said input is from a sensor of the mobile device comprising a camera and a GPS device, wherein the messages sent by the server situationally vary based on the input from the sensor.

* * * * *